United States Patent Office 2,957,665
Patented Oct. 25, 1960

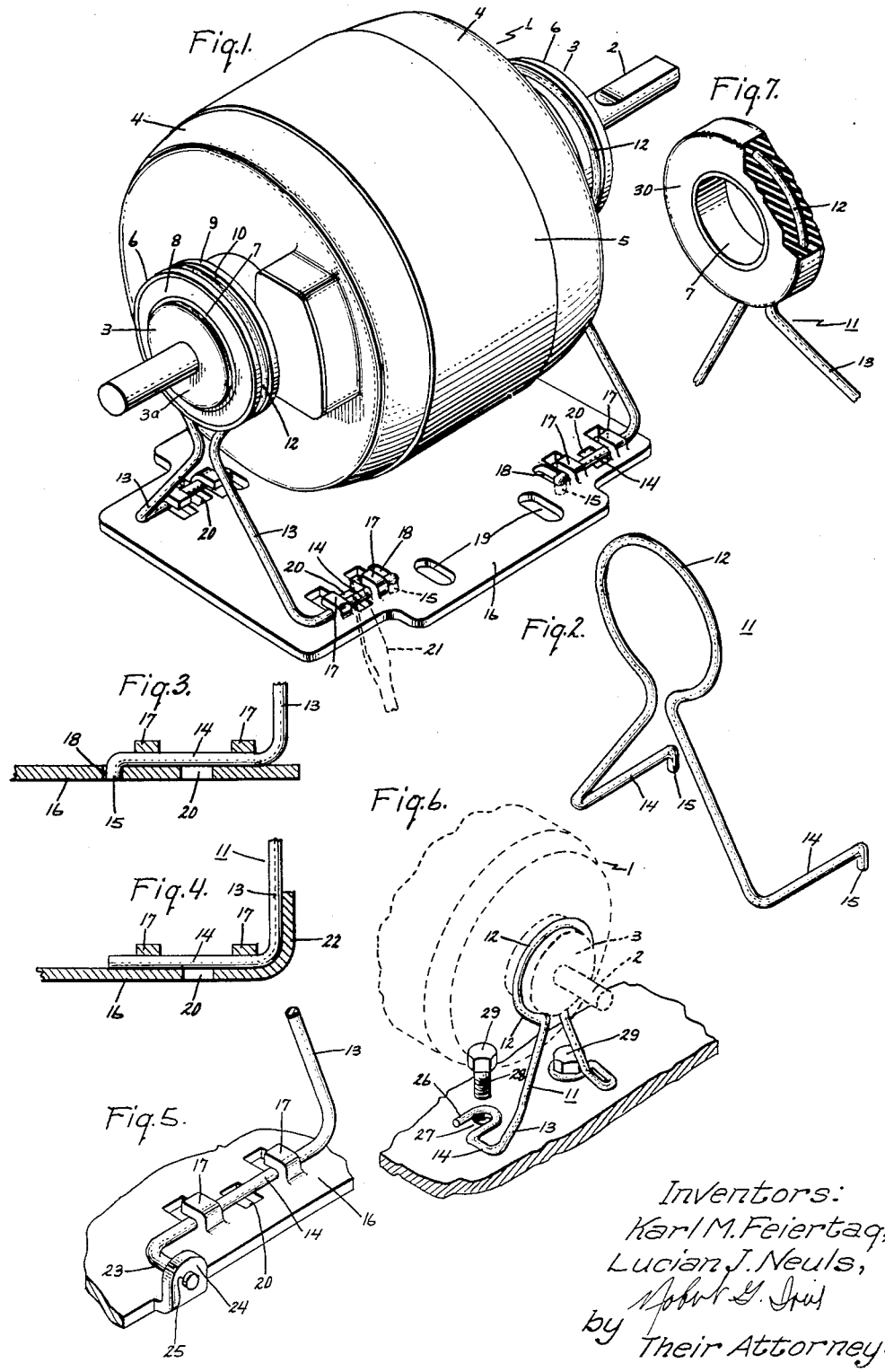

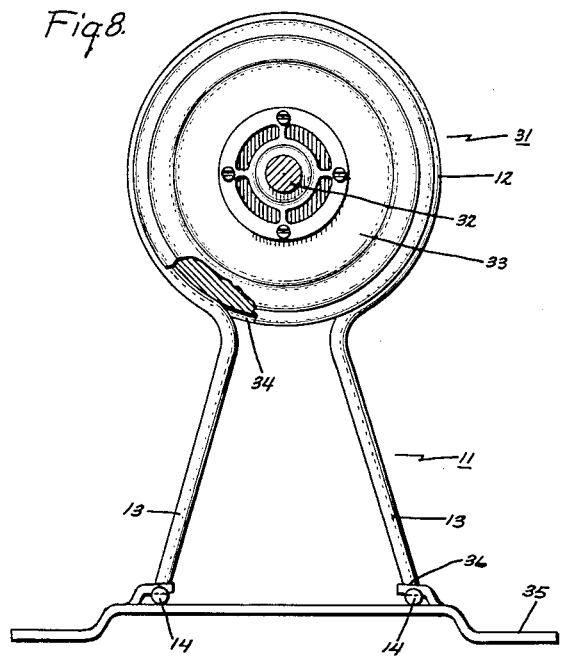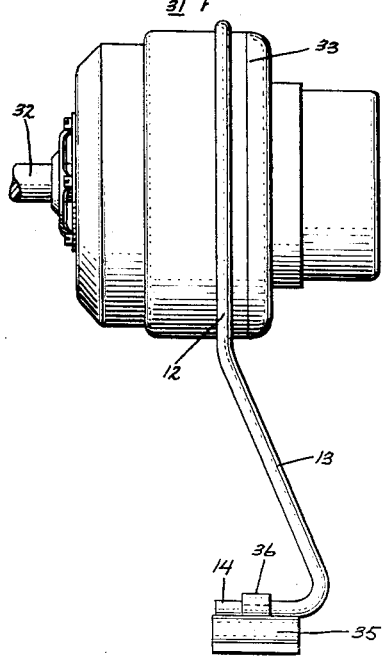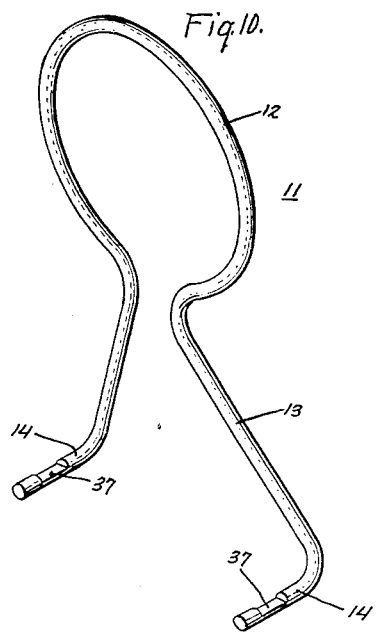

2,957,665

MACHINE MOUNTING ASSEMBLY

Karl M. Feiertag and Lucian J. Neuls, Fort Wayne, Ind., assignors to General Electric Company, a corporation of New York Filed Oct. 18, 1956, Ser. No. 616,830

3 Claims. (Cl. 248—19)

This invention relates to mounting assemblies, and more particularly to an improved mounting construction especially useful in connection with small machines having rotating parts.

As the use of small machines such as electric motors increases, the necessity for dependable and secure positioning with a minimum of expense increases accordingly. While various constructions have been used in the part with reasonable success insofar as the secureness of the mounting is concerned, their cost has always been relatively high. One feature which has usually added to their expense has been the fact that a considerable number of parts was required to secure the machine to its base; such parts were of different shapes, requiring different manufacturing operations for each part and assembly of the parts into a unit prior to the actual securement of the machine to its base. It is most important therefore to reduce to a minimum the number of parts required for mounting a machine to a base while at the same time insuring that the parts are economical to manufacture and readily assembled to the motor and the base. It is also, of course, desirable that the mounting parts be such as to permit simplification of the base so as to permit further economies to be effected.

It is, therefore, an object of this invention to provide an improved machine mounting construction which provides a smaller number of parts of simpler manufacture than heretofore provided, which parts are readily assembled to perform their function.

A further object of the invention is to provide an improved mounting construction such as described above without any decrease in the effectiveness of the mounting insofar as positive positioning of the machine is concerned.

Yet a further object of the invention is to provide a mounting arrangement which will permit simplification and in the construction of the base to which the machine is to be mounted as a result of the improved mounting construction.

In one aspect thereof, the invention provides a machine with a rotatable member and a stationary member which is positioned about the rotatable member. Means are provided for supporting the machine on a substantially flat base in spaced relation thereto: in essence, the means include a unitary length of stiff spring material which includes a curved portion tightly engaging substantially more than half the periphery of the stationary member of the machine. A pair of leg portions are formed respectively joining the ends of the curved portion and extending radially beyond the machine to the extent that a line joining them is also radially beyond the machine. With this arrangement the leg portion may be secured to the base so as to mount the machine properly thereon.

The features of the invention which are believed to be novel are set forth with particularity in the appended claims. The invention itself, however, together with further objects thereof, may best be understood by reference to the following description taken in connection with the accompanying drawings.

In the drawings,

Figure 1 is a view in perspective of a small electric motor provided with the improved mounting arrangement of the invention;

Figure 2 is a view in perspective of the unitary member of the improved mounting construction;

Figure 3 is a fragmentary side view, partly in cross section, showing the securement of the member of Figure 2 to a base;

Figures 4, 5, and 6 illustrate three modifications of the construction for securing the unitary member to the base;

Figure 7 is a fragmentary view in perspective, partly broken away and partly in cross section showing another improved mounting construction;

Figure 8 is an end view showing a modification of the invention;

Figure 9 is a side view of the construction of Figure 8; and

Figure 10 is a view in perspective of the unitary member utilized in the modified construction illustrated in Figures 8 and 9.

Referring now to Figures 1, 2, and 3 of the drawings, there is shown a small electric motor, generally indicated at 1, having a shaft member 2 rotatably supported within hubs, generally indicated at 3. The hubs 3, as shown, include an inner hub section 3a formed integrally with end shields 4 which, together with cylindrical housing member 5, form the housing for motor 1. It will be understood that while, for illustrative purposes, an electric motor is shown, the invention which is to be described is applicable to small machines in general and is not limited to motors.

In order to isolate the vibrations of motor 1 from its base, it is quite customary to include with each hub 3 a resilient annulus 6 which comprises an inner metal ring 7, a rubber ring 8, and an outer metal ring 9 which may be provided with a circumferential groove 10 as shown. Such resilient annuli are more completely disclosed in Patent 2,074,136 issued on March 16, 1937, to A. F. Welch, and assigned to the assignee of this application. Thus it is understood, of course, that the term "hub" in its broader sense includes both the hub section 3a of the end shield and the resilient annulus 6 for the purposes of this invention.

A supporting member 11 formed of a length of stiff spring material such as, for instance, steel music wire, is provided with a curved portion 12 which fits within groove 10 so as to engage tightly a major part of the periphery of resilient annulus 6, i.e. substantially more than half thereof. As shown, it is preferable to make curved portion 12 of a length such that it engages almost all of the periphery of annulus 6; however, where it is desired for any reason, a lesser amount of the periphery of annulus 6 may be engaged so long as it is well over half to preclude separation of annulus 6 and unitary member 11. At each of its ends, curved portion 12 extends into a leg portion 13. Each leg portion 13 is provided with a foot 14 terminating in a downwardly extending toe 15; leg portions 13 are preferably formed divergently in a V starting from the ends of curved portion 12 so as to have their feet 14 fairly widely separated. Legs 13 extend radially a distance such that a line joining each pair of feet 14 is radially beyond motor 1, and a plane joining all the feet 14 (where there are more than two) meets the same requirement; this ensures that the motor will be spaced from any base on which it is positioned, as further explained below.

A substantially flat base 16, which may be formed from sheet metal for instance, has a pair of tabs 17 formed therein in each corner by any suitable means such as punching. Tabs 17 are substantially in alignment with each other and with openings 18 and 20 which are also formed in base 16 adjacent each pair of tabs, as shown. Preferably, the two pairs of tabs at each end of base 16 are spaced apart a distance which is slightly less than the distance between the two feet 14 of a member 11 when legs 13 are in unbiased position. To assemble the various parts together, curved portion 12 of member 11 is spread slightly apart so as to fit over annulus 6. Upon release, curved portion 12 will engage the outer periphery of annulus 6 very tightly so as to secure it. The feet 14 are then forced toward each other until they can be inserted within the tabs 17 with each toe 15 in an opening 18. At this point, after release, the assembly is complete, with member 11 holding the motor 1 to the base 16 and with feet 14 being prevented from sideways movement by the tabs 17 and from end ways movement by the toes 15. Base 16 in turn may be secured to any suitable foundation by means of suitable engaging members extending through openings 19.

When it is desired to disengage motor 1 from base 16, it is merely necessary to force legs 13 together until feet 14 are disengaged from tabs 17. This may be very conveniently effected by inserting a screw driver 21 into the opening 20 to force the foot 14 inwardly sufficiently so that it will clear the tabs 17.

It will be seen from the foregoing that the invention provides an improved machine mounting assembly wherein a single member cooperates with the motor at each end thereof and with the base in order to maintain the motor securely positioned on the base in a particular spaced relation thereto. It will further be seen that the construction, besides being completely effective for the desired purpose, is one which is highly economical since it involves a relatively simple part which may be formed from inexpensive material, such as wire, for instance; all that is needed is to cut the wire to length and provide the necessary bends therein. It will further be observed that the elimination of special vertical flanges on the motor base such as have been commonly used heretofore in connection with such types of machines. This permits a considerable savings in material to be effected; in addition, it actually strengthens the construction since the base which results from the provision of a vertical flange at each end of the horizontal portion naturally has the weaknesses inherent in a U-shaped structure. Also, in cases where the ventilation of the motor or the machine is effected through the end thereof, the previous construction has blocked off a considerable area of the end shield as opposed to the present construction.

Referring now to Figure 4, there is shown a modified construction of the foot 14 of the member 11. In this case, foot 14 is not provided with a toe 15 at the end thereof, and the opening 18 in base 16 which was explained in connection with Figures 1 to 3 is also eliminated. In lieu thereof, longitudinal movement of the feet relative to the base is precluded by providing a very small vertical flange 22 at the end of the base 16 which will back up the leg 13 of member 11 and hold it in position against axial movement in cooperation with the nearest tab 17 which precludes axial movement in the other direction.

Referring now to Figure 5, yet another method of securing foot 14 of member 11 to base 16 is shown. In this case, a horizontally extending toe 23 is provided at the end of foot 14, and an upstanding tab 24 with a central opening 25 is provided at the side of base 16. In its assembled position, foot 14 is secured within tabs 17 as before, and the end of toe 23 extends into opening 25 of tab 24 so as to be secured against any axial movement.

The three constructions described in connection with Figures 3, 4 and 5 for securing feet 14 to base 16 are all relatively closely related. However, where so desired, member 11 may have its feet 14 formed to be secured directly to a foundation rather than to a sheet metal base such as the bases described in connection with Figures 1 to 5. Thus, referring now to Figure 6, each foot 14 may be provided with an inwardly extending loop 26. The opening 27 formed by loop 26 will then be available to perform the same function as opening 19 described in connection with Figure 1. Any desired securing means, such as threaded members 28, may be positioned to extend through openings 27, with the heads 29 of members 28 abutting the top of the wire forming the loop 26 and the remainder of the threaded member secured within whatever foundation is provided for the motor. It will be observed that, with the exception of the threaded members 28, the arrangement requires only the same small number of readily formed parts that was explained in connection with Figures 1 to 3.

It will be understood that while Figures 1 to 3 have shown the invention with member 11 arranged around annulus 6 which is, in turn, a part of hub 3, the mounting will be equally effective in those situations where the vibrations are not such as to require the presence of the annulus, if annulus 6 is entirely eliminated from the mounting arrangement, as shown in Figure 6. However, where it is desired to provide such an annulus, a further improvement is then possible as explained in connection with Figure 7. As before, an inner ring 7 and a rubber ring 8 are provided for cushioning the vibrations. However, instead of the outer metal ring 9 which was previously provided, curved portion 12 of member 11 is molded into the rubber (or other resilient material) as shown. This improvement of Figure 7 now forms the subject matter of and is claimed in our divisional application, Serial No. 860,997, filed December 21, 1959.

Referring now to Figures 8, 9, and 10, a further modification of the invention will be described. A small motor, generally indicated at 31, includes a rotatable shaft member 32 and a housing structure 33 provided with a peripheral groove 34 which is preferably axially located substantially at the center of gravity of the machine. As before, a unitary member 11 formed from a length of stiff spring material is provided with a curved portion 12, legs 13 and feet 14. In this modification, curved portion 12 extends around the periphery of housing 33 in groove 34 rather than being positioned at the two ends of the housing as was the case in the previously described embodiments. The fact that curved portion 12 is within groove 34 precludes any axial sliding of motor 31 relative to portion 12 and the tightness with which portion 12 may be made to grip the housing 33 will effectively preclude any tendency of the motor to turn relative to member 11. A base 35 is provided with tabs 36 which fit into flats 37 formed in feet 14 of member 11. The provision of flats 37 and their engagement with tabs 36 illustrates yet another method of securing member 11 to a base so as to preclude relative motion therebetween. As is best seen in Figure 9, legs 13 are preferably bent so as to have an axial component of length; in this manner, the support is provided directly below curved portion 12 and precludes unnecessary torques being created about the base. It will be seen that this modification illustrates a construction where the mounting assembly is completed between the motor and the base by the provision of a single readily formed and economically available part.

While this invention has been explained by describing particular embodiments thereof, it will be apparent that improvements and modifications may be made without departing from the scope of the invention as defined in the appended claims.

What we claim as new and desire to secure by Letters Patent of the United States is:

1. A machine having a rotatable member and a stationary member positioned about said rotatable member; a substantially flat base for said machine; and means supporting said machine on said base in spaced relation thereto comprising a unitary length of stiff spring material including a curved portion tightly engaging substantially more than half the periphery of said stationary member, and a pair of leg portions respectively joining the ends of said curved portion and extending beyond said machine to the extent that a line joining them is radially beyond the machine, the ends of said legs being bent into feet parallel to said base, and tab means formed on said base in engagement with said feet so as to retain the same in assembled relation against said base.

2. A machine having a rotatable member and a stationary member positioned about said rotatable member; a substantially flat base for said machine; and means supporting said machine on said base in spaced relation thereto comprising a unitary length of stiff spring material including a curved portion tightly engaging substantially more than half the periphery of said stationary member, and a pair of leg portions respectively joining the ends of said curved portion and extending beyond said machine to the extent that a line joining them is radially beyond the machine, the ends of said legs being bent into feet parallel to said base, the ends of said feet being bent into toes substantially perpendicular to said feet, tabs formed on said base in engagement with said feet so as to retain the same in assembled relation against said base, said base having openings formed therein adjacent said tabs, said toes extending into said openings so as to preclude axial movement of said feet relative to said base.

3. A machine having a rotatable member and a stationary member positioned about said rotatable member; a substantially flat base for said machine; and means supporting said machine on said base in spaced relation thereto comprising at least one unitary length of stiff spring material including a curved portion tightly engaging substantially more than half the periphery of said stationary member, and a pair of leg portions respectively joining the ends of said curved portion and extending beyond said machine to the extent that a line joining them is radially beyond the machine, the ends of said leg portions formed into feet substantially parallel to a portion of said base, and means for securing said feet to said base so as to retain them in assembled relation on said base.

References Cited in the file of this patent

UNITED STATES PATENTS

| | | |
|---|---|---|
| 2,498,126 | Koch | Feb. 21, 1950 |
| 2,591,669 | Bucknell | Apr. 8, 1952 |
| 2,636,703 | Wallans | Apr. 28, 1953 |
| 2,803,416 | Berlien | Aug. 20, 1957 |
| 2,808,219 | Petrick | Oct. 1, 1957 |

FOREIGN PATENTS

| | | |
|---|---|---|
| 100,945 | Sweden | Feb. 25, 1941 |